United States Patent [19]
Harris

[11] Patent Number: 5,534,990
[45] Date of Patent: Jul. 9, 1996

[54] FULL COLOR PRINTING SYSTEM USING A PENTA-LEVEL XEROGRAPHIC UNIT

[75] Inventor: Ellis D. Harris, Claremont, Calif.

[73] Assignee: Xerox Corporation, Stamford, Conn.

[21] Appl. No.: 422,197

[22] Filed: Mar. 31, 1995

[51] Int. Cl.⁶ ............................................. G03G 15/01
[52] U.S. Cl. ..................... 355/327; 355/326 R; 347/115; 430/42
[58] Field of Search .............................. 355/326 R, 327, 355/328; 347/115; 430/42

[56] References Cited

U.S. PATENT DOCUMENTS

| 4,731,634 | 3/1988 | Stark | 355/328 |
| 5,049,949 | 9/1991 | Parker et al. | 430/42 X |
| 5,155,541 | 10/1992 | Loce et al. | 355/328 |
| 5,221,954 | 6/1993 | Harris | 355/327 |
| 5,223,906 | 6/1993 | Harris | 355/326 R |
| 5,367,327 | 11/1994 | Harris | 347/115 |

Primary Examiner—Matthew S. Smith
Attorney, Agent, or Firm—William Propp

[57] ABSTRACT

A single pass full color printing system consists generally of a raster output scanner (ROS) optical system and a quad-level xerographic unit and a penta-level xerographic unit in tandem. This full color printing system produces pixels of black and white and all six primary colors without toner upon toner.

12 Claims, 1 Drawing Sheet

FULL COLOR PRINTING SYSTEM USING A PENTA-LEVEL XEROGRAPHIC UNIT

CROSS-REFERENCE TO RELATED APPLICATIONS

This application contains subject matter that is related to subject matter of patent application Ser. No. 08/422,203 filed contemporaneously, commonly assigned to the same assignee herein and herein incorporated by reference.

BACKGROUND OF THE INVENTION

The present invention relates generally to a single pass full color printing system and, more particularly, to a color printing system consisting generally of a raster output scanner (ROS) optical system and a quad-level xerographic unit and a penta-level xerographic unit in tandem which can print pixels producing black and white and all six primary colors without printing toner upon toner.

In the practice of conventional bi-level xerography, two charge levels are produced on a charge retentive surface such as a photoconductive member or photoreceptor. The highly charged (i.e. unexposed to a light beam) areas are developed with toner. The discharged (or exposed to the light beam) areas are not developed with toner. These two levels can be developed to print black and white.

In tri-level, highlight color imaging, unlike conventional xerography, upon exposure, three charge levels are produced on the charge-retentive surface. The highly charged (i.e. unexposed) areas are developed with toner, and the area most fully discharged is also developed, but with a toner of a different color. The intermediately charged (or partially discharged by a light beam) area is not developed with toner. Thus, the charge retentive surface contains three exposure levels; zero exposure, intermediate exposure, and full exposure, which correspond to three charge levels. These three levels can be developed to print, for example, black, white, and a single color.

In quad-level or four-level color imaging, upon exposure, four charge levels are produced on the charge-retentive surface. Thus, the charge retentive surface contains four exposure levels; zero exposure, a low intermediate exposure, a high intermediate exposure and full exposure, which correspond to the four charge levels. These four levels can be developed to print, for example, black, white, and two colors.

An illustrative example of a quad-level xerographic unit is found in U.S. Pat. Nos. 4,731,634 and 5,155,541, commonly assigned with this application and herein incorporated by reference.

A quad-level xerographic unit, unlike the bi-level and tri-level, does not produce color images that match the toner colors. Two of the toner colors are produced while the third color produced is a combination of one of those first two toner colors and a third toner color.

There are alternate quad-level xerographic units for carrying out the desired formation of three different color pixels on the photoreceptor means of the present invention. Some of these alternatives, such as U.S. Pat. No. 5,049,949, assigned to the same assignee as the present invention and herein incorporated by reference, do not use the combining of two color toners to form a third color pixel on the photoreceptor means, but rather directly deposit three different color toners upon the photoreceptor means without combination.

A single pass color printing system of a raster output scanner (ROS) optical system and two tri-level xerographic units in tandem will produce black and white and five of the six primary colors, with pixel next to pixel printing producing all but the strongest saturation of the sixth primary color, an additive primary color. However, only two of the three subtractive primary colors of cyan, magenta and yellow are available for toner dot upon toner dot to combine to produce the additive primary colors. This single pass color printing system is found in U.S. Pat. No. 5,223,906, commonly assigned with this application and herein incorporated by reference.

A full color process would print the six primary colors of cyan, yellow, magenta, blue, green, and red, in addition to black and white.

A single pass full color printing system of a raster output scanner (ROS) optical system and a quad-level xerographic unit and a tri-level xerographic unit in tandem will produce black and white and all six primary colors with toner upon toner. This single pass color printing system is found in U.S. Pat. No. 5,221,954, commonly assigned with this application and herein incorporated by reference.

Both of these prior art approaches require toner of one color upon toner of a second color and are referred to in the art as Dot-On-Dot (DOD). The additive primary colors of red, green and blue are formed by mixing the subtractive primary colors of cyan, yellow and magenta.

When the red, green and blue colors must be obtained by mixing the cyan, yellow and magenta colors, there is always some color deficiency in the red, green and blue. The red formed by DOD mixing of yellow and magenta cannot recreate the deep red tones observed in nature. Because of the limitations of magenta, the red from magenta and yellow is actually an orange-red and the blue from magenta and cyan has a purplish hue. Smaller but similar deficiencies exist in the cyan and can exist in the yellow.

The use of actual red, green and blue toners enhances the coverage of the color gamut and enables richer hues throughout in a full color printing system.

A penta-level xerographic unit produces five exposure levels on a photoreceptor. The five exposure levels select between a subtractive and an adjacent additive primary color in both the Charge Area Development (CAD) and Discharge Area Development (DAD). The exposure level intermediate between the CAD and the DAD results in white. The selection of two possible colors in CAD, or two possible colors in DAD, or the selection of no toner can be developed to print, for example, black, white, and three colors. This penta-level xerographic unit is found in patent application Ser. No. 08/422,203 filed contemporaneously, commonly assigned to the same assignee herein and herein incorporated by reference.

It is an object of this invention to provide a color printing system using a penta-level xerographic unit.

It is another object of this invention to provide a color printing system using a quad-level xerographic unit and a penta-level xerographic unit.

It is still another object of this invention to provide a full color printing system without toner upon toner.

It is yet another object of this invention to provide a full color printing system with the additive primary colors developed without combining subtractive primary color toners.

It is yet another object of this invention to provide a full color printing system by combining subtractive primary color toners utilizing toner-on-toner to produce the additive primary colors.

SUMMARY OF THE INVENTION

In accordance with the present invention, a single pass full color printing system consists generally of a raster output scanner (ROS) optical system and a quad-level xerographic unit and a penta-level xerographic unit in tandem. This full color printing system produces pixels of black and white and all six primary colors without toner upon toner.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
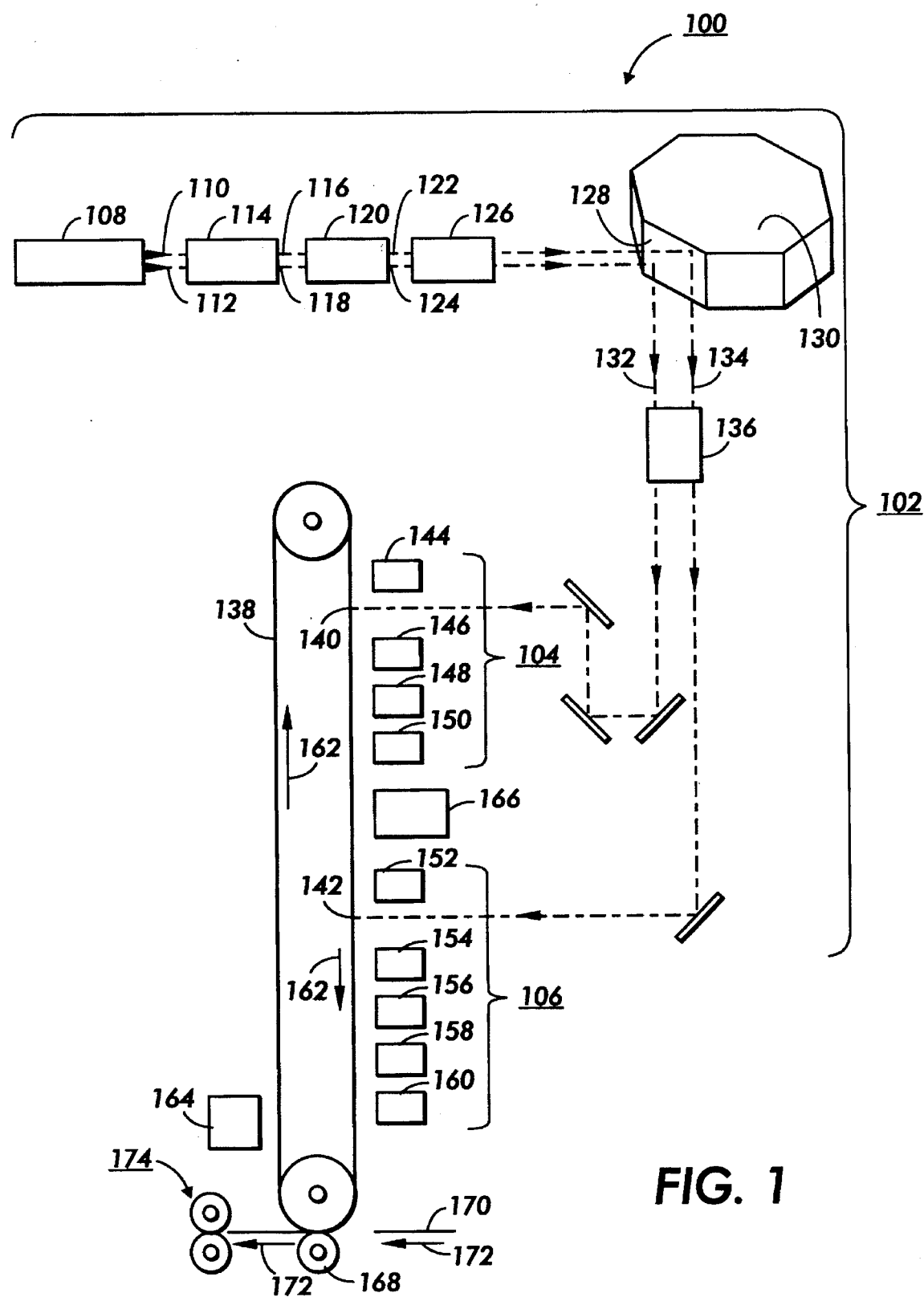
FIG. 1 is a schematic view of the single pass full color printing system using a quad-level xerographic unit and a penta-level xerographic unit formed according to the present invention.

Reference is now made to FIG. 1, wherein there is illustrated a single pass full color printing system 100. The color printing system 100 consists generally of a raster output scanner (ROS) optical system 102, a quad-level xerographic unit 104 and a penta-level xerographic unit 106.

In the raster output scanner 102, a light source 108 emits two coherent laser beams 110 and 112 which are collimated and otherwise conditioned by collimating optical element 114. The two collimated beams 116 and 118 are independently modulated by dual channel modulator 120. The two modulated beams 122 and 124 are re-collimated, further conditioned and focused by optical element 126 onto a facet 128 of a rotating multi-faceted polygon mirror 130. The reflected, modulated beams 132 and 134 are imaged and focused by f-theta imaging and distortion correction optical element 136 and reflected by folding mirrors onto the photoreceptor belt 138 at two separate locations 140 and 142.

The first beam 132 is focused at point 140 on the photoreceptor belt 138 between the charging station 144 and the first, second and third developer stations 146, 148 and 150 of the quad-level xerographic unit 104. The second beam 134 is focused at point 142 on the photoreceptor belt 138 between the charging station 152 and the first, second, third and fourth developer stations 154, 156, 158 and 160 of the penta-level xerographic unit 106.

The photoreceptor belt 138 moves in the direction of arrow 162 to advance successive portions of the belt sequentially through the various processing stations disposed about the path of the photoreceptor belt. The belt advances driven by rollers and motors and belt drives (not shown).

Initially, successive portions of the photoreceptor belt 138 pass through a cleaning station 164. The cleaning station removes any residual toner particles and any residual charges from the photoreceptor belt.

The belt 138 next advances through the charging station 144 of the quad-level xerographic unit 204. The charging station charges the belt to a selectively high uniform potential, $V_0$.

The charged belt 138 is then exposed to the modulated light beam 132 from the raster output scanner (ROS) optical scanner, which causes the charged surface of the belt to be discharged in accordance with the modulated output of the beam 132. In quad-level or four-level color imaging, upon exposure, four separate and different discharge and exposure levels are produced on the charge-retentive surface. Thus, the charge retentive surface contains four exposure levels; zero exposure, a low intermediate exposure, a high intermediate exposure and full exposure, which correspond to the four charge levels.

The photoconductive belt 138, which is initially charged to a voltage $V_O$ (approximately minus 1000 volts), is discharged to $V_w$ (approximately minus 700 volts) imagewise in the background (white) image areas and to $V_d$ (approximately minus 350 volts) and $V_a$ (approximately minus 100 volts) in the highlight (i.e. colors other than black)image areas.

The photoreceptor belt 138 next passes through the first, second and third developer stations 146, 148 and 150 of the quad-level xerographic unit 104.

The black toner from the first developer housing 146 is attracted to the $V_O$ voltage areas on the photoreceptor 138 and repelled from the other two charged areas, $V_d$ and $V_a$ by Charge Area Development (CAD). The positively charged black toner from the first developer housing 146 is attracted to the $V_O$ voltage areas on the photoreceptor belt 138 which are at a charge level of minus 1000 volts since the bias on the first developer is minus 800 volts. The positively charged black toner is attracted to the photoreceptor areas which are more negative than the developer housing. Conversely the positively charged black toner from the first developer housing is not attracted to the photoreceptor areas, $V_d$ (approximately minus 350 volts) and $V_a$ (approximately minus 100 volts), that are more positive than the first developer housing bias of minus 800 volts.

The red toner from the second developer housing 148 is attracted to the $V_a$ voltage areas on the photoreceptor 138 and repelled from the other two charged areas, $V_d$ and $V_O$ by Discharge Area Development (DAD). The voltage level $V_a$ of minus 100 volts is less negative than the minus 300 volts of the second developer housing 148 and the negative charge of the red toner. The red toner is not attracted to the photoreceptors areas of voltage levels $V_d$ of minus 350 volts because these areas are more negative than the minus 300 volts bias of the second developer housing 148 and thus repell the red toner.

The yellow toner from the third developer housing 150 is attracted to both the $V_a$ and the $V_d$ voltage areas on the photoreceptor 138 by Discharge Area Development (DAD). The voltage levels of $V_d$ of minus 350 volts and $V_a$ of minus 100 volts are both more positive than the minus 600 volts bias of the third developer housing 150 and the negatively charged yellow toner.

Thus, in the quad-level xerographic unit 104, the $V_O$ voltage areas on the photoreceptor attracts the black toner from the first developer housing 146 to produce a black color image. The $V_d$ voltage areas on the photoreceptor attracts the yellow toner from the third developer housing 148 to produce a yellow color image. The $V_a$ voltage areas photoreceptor attracts the red toner from the second developer housing 148 and the yellow toner from the third developer housing 150 to produce a red color image. The areas of the photoreceptor charged to $V_w$ of minus 700 volts are not developed by any of the toners because the biasing of the toner housings and the polarities of the toners.

The photoreceptor belt may then advance through the erasure section 166 which removes any residual charges from the quad-level xerographic unit 104 on the photoreceptor belt. The erasure section does not remove, nor effect, any toner on the belt from the quad-level xerographic unit. The erasure section is optional since the charging station of the next xerographic unit will provide a uniform charge to the belt.

The belt 138 next passes through the charging station 152 of the penta-level xerographic unit 106. The charging station charges the belt to a selectively high uniform potential, $V_0$.

The charged belt 138 is then exposed to the modulated light beam 134 from the raster output scanner (ROS) optical scanner, which causes the charged surface of the belt to be discharged in accordance with the modulated output of the beam 134, resulting in a photoreceptor containing five or penta exposure levels. The five voltage levels remaining on the photoreceptor after exposure and discharge are approximately minus 1000 volts, minus 630 volts, minus 380 volts, minus 210 volts and minus 100 volts. The five voltage levels are the no exposure or the highest voltage level, low intermediate exposure or the next highest voltage level, intermediate exposure or intermediate voltage level, high intermediate exposure or the next lowest voltage level, and full exposure or the lowest voltage level. These five voltage levels on the photoreceptor correspond to four image areas and a background or white area.

The minus 1000 volt level results from the laser beam of the ROS being turned off at that region of the photoreceptor so no exposure and discharge occurs there. The minus 100 volt level region received maximum exposure of the laser beam of the ROS so that the photoconductive discharges to its residual voltage level. The intermediate voltage levels of minus 630 volts, minus 380 volts, and minus 210 volts are obtained by using the laser beam of the ROS at intermediate power levels.

The photoreceptor belt 138 next passes through the first, second, third and fourth developer stations 154, 156, 158 and 160 of the penta-level xerographic unit 106.

By way of example, the first developer housing 154 contains positively charged blue toner with an electrical bias to the housing set at minus 740 volts. Charge Area Development (CAD) is used. The blue toner is attracted to the minus 1000 volt level areas of the photoreceptor 138 and repelled from the other four voltage level charged areas of the photoreceptor 138. The positively charged blue toner is attracted to the minus 1000 volt level areas of the photoreceptor 138 which are more negatively charged than the minus 740 volt charged housing 154. Conversely, the positively charged blue toner in the housing will not be attracted to the photoreceptor areas (of minus 630 volts, minus 380 volts, minus 210 volts and minus 100 volts) that are more positive than the housing bias of minus 740 volts.

As blue toner moves to the photoreceptor 138, the voltage level of that area of the photoreceptor 138 will approach and even come to equal the bias level of the blue toner developer housing, minus 740 volts.

The second developer housing 156 contains positively charged magenta toner with an electrical bias to the housing set at minus 510 volts. Charge Area Development (CAD) is used. The magenta toner is attracted to the minus 740 volt level remaining on the photoreceptor 138 after the blue toner developer housing 154 and the minus 630 volt level areas of the photoreceptor 138 and repelled from the other three voltage level charged areas of the photoreceptor 138. The positively charged magenta toner is attracted to the minus 740 volt level areas of the photoreceptor 138 which are more negatively charged than the minus 510 volt charged housing 156. The positively charged magenta toner is also attracted to the minus 630 volt level areas of the photoreceptor which are more negatively charged than the minus 510 volt charged housing 156. Conversely, the positively charged magenta toner in the housing will not be attracted to the photoreceptor areas (of minus 380 volts, minus 210 volts and minus 100 volts) that are more positive than the housing bias of minus 510 volts.

As magenta toner moves to the photoreceptor, the voltage level of that area of the photoreceptor will approach and even come to equal the bias level of the magenta toner developer housing, minus 510 volts. Following passage of the blue and magenta toner developer housings, the voltage levels on the photoreceptor will never be more negative than the magenta toner developer housing.

Despite the magenta toner being deposited upon the blue toner in the minus 1000 volt level areas of the photoreceptor, the resulting color in those areas will still be blue.

The third developer housing 158 contains negatively charged green toner with an electrical bias to the housing set at minus 170 volts. Discharge Area Development (DAD) is used. The green toner is attracted to the minus 100 volt level areas of the photoreceptor 138 and repelled from the other four voltage level charged areas of the photoreceptor 138. The negatively charged green toner is attracted to the minus 100 volt level areas of the photoreceptor which are more positively charged (or less negatively charged) than the minus 170 volt charged housing 158. Conversely, the negatively charged green toner in the housing will not be attracted to the photoreceptor areas (of minus 1000 volts, minus 630 volts, minus 380 volts, and minus 210 volts) that are more negative than the housing bias of minus 170 volts.

As green toner moves to the photoreceptor 138, the voltage level of that area of the photoreceptor will approach and even come to equal the bias level of the green toner developer housing, minus 170 volts.

The fourth developer housing 160 contains negatively charged cyan toner with an electrical bias to the housing set at minus 260 volts. Discharge Area Development (DAD) is used. The cyan toner is attracted to the minus 170 volt level remaining following green toner development and also to the minus 210 volt level areas of the photoreceptor 138 and repelled from the other voltage level charged areas of the photoreceptor which are more negative than minus 260 volts. The negatively charged cyan toner is attracted to the minus 170 volt level areas of the photoreceptor 138 which are more positively (less negatively) charged than the minus 260 volt charged housing 160. The negatively charged cyan toner is also attracted to the minus 210 volt level areas of the photoreceptor which are more positively (less negatively) charged than the minus 260 volt charged housing 160. Conversely, the negatively charged cyan toner in the housing will not be attracted to the photoreceptor areas (of minus 1000 volts, minus 630 volts, and minus 380 volts) that are more negative than the housing bias of minus 260 volts.

Following passage of the green and cyan toner developer housings, the voltage levels on the photoreceptor will never be more positive than the minus 260 volt bias of the cyan toner developer housing.

Despite the cyan toner being deposited upon the green toner in the minus 100 volt level areas of the photoreceptor, the resulting color in those areas will still be green.

No toner is deposited on the photoreceptor belt having intermediate exposure. The charged areas of the charge retentive surface of the photoreceptor of minus 380 volts are not developed by any of the toners from the four developer housings of the penta-level xerographic unit because of the electrical bias of the toner housings and the polarities of the toners. This area typically becomes white.

Toner from the developer housings of the second xerographic unit 106 is not deposited on toner on the photoreceptor belt from the developer housings of the first xerographic unit 104. This function is accomplished in the system electronics which causes those photoreceptor belt areas containing toner from the first xerographic unit 104 to be exposed to the intermediate level.

The photoreceptor belt 138 then advances through the transfer station 168. A sheet of support material 170, such as paper, is moved into contact with the toner upon the photoreceptor belt 138 at the transfer station 168 to transfer the toner to the sheet 170. The toner deposited upon the belt and thus the toner transferred to the sheet would include toner from both xerographic units 104 and 106.

After transfer, the sheet 170 moves in the direction of arrow 172 which advances the sheet to fusing station 174. Fusing station 174 permanently affixes the transferred toner image to the sheet 170.

After the toner is separated from the photoreceptor belt, the belt 138 then passes through the cleaning station 164 and the printing cycle is complete. The cleaning station removes any residual toner particles and any residual charges from the photoreceptor belt.

In this illustrative example, the quad-level xerographic unit has black toner in the first developer housing, red toner in the second developer housing and yellow toner in the third developer housing. Thus, the quad-level xerographic unit would produce black and white, yellow and red (yellow upon red) colors.

The penta-level xerographic unit has blue toner in the first developer housing, magenta toner in the second developer housing, green toner in the third developer housing and cyan toner in the fourth developer housing. Thus, the penta-level xerographic unit would produce white, blue (magenta upon blue), magenta, green (cyan upon green) and cyan.

A full process full color printing system would be able to produce pixels of black and white and all six primary colors; red, green, blue, cyan, magenta and yellow.

The combination of the quad-level xerographic unit and the penta-level xerographic unit in the single pass full color printing system 100 does produce black and white and all six primary colors without combining toner upon toner to form a different color toner.

In general, the quad-level and the penta-level xerographic units have a total of seven developer housings, three in CAD (of which one is black) and four in DAD. Of the six remaining developer housings, the three developer housing biased closest to the intermediate or white exposure and voltage level in both CAD and DAD will necessarily contain the three subtractive primary color toners of cyan, magenta and yellow. Those nearest the no exposure and highest voltage or the full exposure and lowest voltage may contain the three additive primary colors or red, green and blue.

It is not essential that the quad-level xerographic unit is first in tandem with the penta-level xerographic unit. The color printing system of the present invention will produce the same full color printing system with the penta-level xerographic unit first in tandem with the quad-level xerographic unit.

If the restriction of not combining toner upon toner to form a different color toner is removed, then subtractive primary colors can be combined to form additive primary colors.

In the case of a toner-upon-toner or DOD full color printing system, magenta toner could be in the third developer housing of the quad-level xerographic unit since yellow (from the second developer housing) and magenta make red. Similarly, the first developer housing of the penta-level xerographic unit could have cyan toner since cyan and magenta (from the second developer housing) make blue. The third developer housing of the penta-level xerographic unit could have yellow toner since yellow and cyan (from the fourth developer housing) make green.

Since the quad-level and the penta-level xerographic units have a total of seven developer housings, one or more of the developer housings can contain specialty ink toners. Examples would include magnetic ink, fluorescent ink, gold, silver or other non-spectrum colors or even proprietary color inks. Full color printing plus a specialty ink toner is possible from the quad-level and the penta-level xerographic units in the case of a toner-upon-toner or DOD full color printing system.

The hue of a color is the primary colors. The saturation of a color extends from the greyest to its most vivid color. The lightness of a color extends from black through a series of gradually lightening greys to white.

In either embodiment, the human eye can not perceive the individual colored spots produced by the color printing system 200. The eye blurs clusters of color pixels together to discern a hue, saturation and lightness that it discerns as a color. Typically, depending upon the size of the individual spot, these pixels can be clustered in a 2 by 4 or a 3 by 3 matrix of individual pixels.

The individual pixels within the matrix can be the same color or different colors. If the individual spots are the same color, then that pixel will be of the strongest saturation of that color, the most vivid shade of that color. By having different colors for the pixels in the matrix, the saturation and hue of the pixel will vary.

By having the pixels in the matrix be exclusively from two adjacent colors in the spectrum, the resulting pixel matrix color will be along the hue boundary between the colors and of the strongest saturation. By having the pixels in the matrix be exclusively from two non-adjacent colors in the spectrum, the resulting pixel matrix color will be of varying hues and saturation. By having the pixels of the matrix be of three or more colors, the hue and saturation of the pixel matrix will vary.

The lightness and darkness of the color produced by the color printing system 100 is achieved by adding white or black color pixels to the matrix. For example, pink, or light red, is printed by having a pixel matrix of 50% red and 50% white.

In general, with regard to all the embodiments of the color printing systems, if the sheet of support material is not white, then a white toner may be used within the developer housings of the xerographic units.

If the first and second modulated beam have the same wavelength, then the color printing system has simpler modulator and optical elements which do not have to be calibrated for two wavelengths and an easier calculation of the optical paths of the two beams. The optical paths of the two beams should be the same length, although it is not impossible to have differing lengths for the optical paths. The dual channel modulator may be able to compensate for any difference in lengths of the optical paths.

The use of a dual beam light source with the two emitted beams sharing the same optical elements in the raster output scanner optical system provides improved pixel placement accuracy upon the photoreceptor belt since a common polygon facet is used. The use of quad-level and tri-level xerographic units also aids in pixel placement accuracy upon the photoreceptor belt. Sharing the optical components also reduces the physical size, the number of optical elements and the costs of the single pass full color printing system.

However, the sharing of optical elements by the dual beams is merely an illustrative example of the color printing system. Two separate light sources could each emit a beam. Each beam could have a separate ROS optical system or just share certain ROS optical elements, like the facet of the rotating polygon mirror. A single light should emit a single beam which is split by beam splitting means anywhere along the ROS optical system, prior to the two tri-level xerographic units.

The photoreceptor belt of the present invention can, in the alternative, be a drum photoreceptor or other equivalents. The quad-level xerographic unit and the penta-level xerographic unit can each have a drum photoreceptor for a dual drum printing system.

The rotating polygon raster output scanner (ROS) optical system 102 can, in the alternative, be a LED image bar or other equivalents.

The light source 108, the collimating optical element 114 and the dual channel modulator 120 can be replaced by a diode laser which is modulated electronically. The diode laser could additionally consist of an array of individual laser elements on a common substrate. Half of the laser elements could be polarized orthogonal to the other half. A polarization sensitive beam splitter would then divide the two beams into separate paths.

There are alternate quad-level xerographic units for carrying out the desired formation of three different color pixels on the photoreceptor means of the present invention. Some of these alternatives, such as U.S. Pat. No. 5,049,949, assigned to the same assignee as the present invention and herein incorporated by reference, do not use the combining of two color toners to form a third color pixel on the photoreceptor means, but rather directly deposit three different color toners upon the photoreceptor means without combination. It should be noted that these other quad-level xerographic units are equally applicable to the present invention.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A single pass full color printing system comprising:
    a raster output scanner optical system for generating a first modulated beam and a second modulated beam,
    a photoreceptor means,
    a quad-level xerographic unit for charging said photoreceptor means, said photoreceptor means then being exposed to said first modulated beam, said quad-level xerographic unit having means for depositing a first color toner, a second color toner, and a third color toner on said photoreceptor means based on the charge, after exposure to said first modulated beam, and
    a penta-level xerographic unit for charging said photoreceptor means, subsequent to said quad-level xerographic unit, said photoreceptor means then being exposed to said second modulated beam, said penta-level xerographic unit having means for depositing a fourth color toner, a fifth color toner, a sixth color toner and a seventh color toner on said photoreceptor means based on the charge, after exposure to said second modulated beam, whereby said color toners produce pixels for black and white and all six primary colors.

2. The single pass full color printing system of claim 1 further comprising:
    means for transferring said toners upon said photoreceptor means onto a sheet of support material.

3. The single pass full color printing system of claim 1 further comprising:
    erasure means between said quad-level xerographic unit and said penta-level xerographic unit for removal of any residual charge on said photoreceptor means.

4. The single pass full color printing system of claim 1 wherein said photoreceptor means is a photoreceptor belt.

5. The single pass full color printing system of claim 1 wherein said photoreceptor means is a photoreceptor drum.

6. The single pass full color printing system of claim 1 wherein said photoreceptor means is a first photoreceptor drum for said quad-level xerographic unit and a second photoreceptor drum for said penta-level xerographic unit.

7. The single pass full color printing system of claim 6 wherein said first color toner is black, said second color toner is red, said third color toner is yellow, said fourth color toner is blue, said fifth color toner is magenta, said sixth color toner is green and said seventh color toner is cyan.

8. The single pass full color printing system of claim 1 wherein at least one of said color toner combines with another of said color toners to form a third color toner.

9. The single pass full color printing system of claim 1 wherein none of said color toner combines with another of said color toners to form a third color toner.

10. The single pass full color printing system of claim 1 wherein said color toners are black and the subtractive primary colors.

11. The single pass full color printing system of claim 1 wherein said color toners are black and at least one of the additive primary colors.

12. The single pass full color printing system of claim 1 wherein at least one of said color toners is not black nor a primary color.

* * * * *